United States Patent [19]

Cox et al.

[11] Patent Number: 4,460,533

[45] Date of Patent: Jul. 17, 1984

[54] APPARATUS AND METHOD FOR THE HEAT TREATMENT OF MATERIALS

[75] Inventors: Robert W. Cox; Herbert E. Janikowski, both of Solihull; David L. Walker, Minsterley; David Hands, Shrewsbury, all of England

[73] Assignees: British Gas Corporation; Rubber & Plastics Research Assoc. of G. Britain, both of England

[21] Appl. No.: 376,089

[22] Filed: May 7, 1982

[30] Foreign Application Priority Data

Apr. 9, 1981 [GB] United Kingdom ............... 8114240

[51] Int. Cl.³ .............................................. B29C 25/00
[52] U.S. Cl. .................................... 264/236; 165/126; 165/169; 264/347
[58] Field of Search ............... 165/126, 124, DIG. 11, 165/169, 170; 264/347, 236; 425/40

[56] References Cited

U.S. PATENT DOCUMENTS

| 1,397,209 | 11/1921 | Hawkinson | 264/347 |
| 1,895,564 | 1/1933 | Beu | 165/121 |
| 3,690,796 | 9/1972 | Borsvold | 264/166 |
| 4,098,331 | 7/1978 | Ford et al. | 165/170 |

Primary Examiner—Donald E. Czaja
Assistant Examiner—Mary A. Becker
Attorney, Agent, or Firm—Jim Zegeer

[57] ABSTRACT

An apparatus and method for the heat treatment of a product such as in the curing of rubber-like materials and the thermoforming of plastics materials. A metallic heat transfer member is provided for contacting the product to transmit heat thereto. In order to obtain a uniform temperature distribution over the heat transfer member/product interface, one or more gas distribution passageways receive hot gas from a hot gas source such as a gas burner and lead the hot gas to the heat transfer member. One or more heat transfer passageways contiguous with the heat transfer member communicate with the gas distribution passageway so as to receive hot gas from the latter passageway and lead same to an exhaust outlet.

17 Claims, 6 Drawing Figures

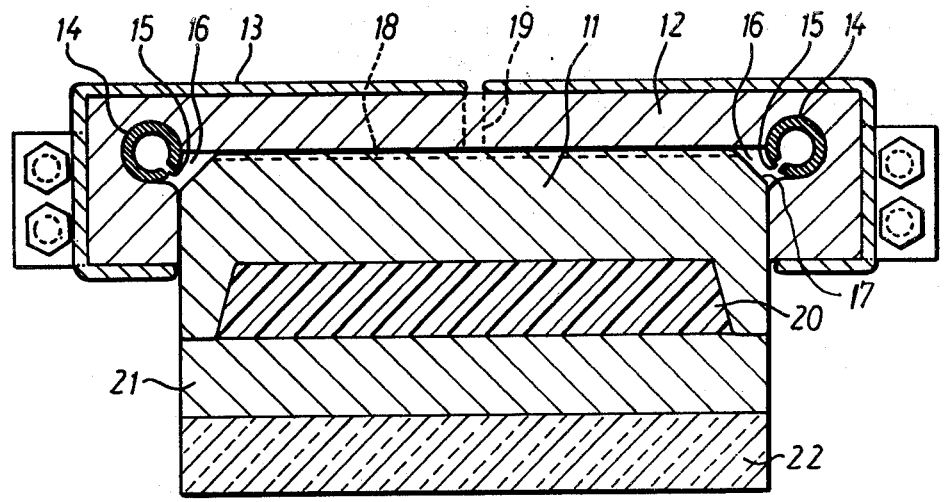
Fig_1.
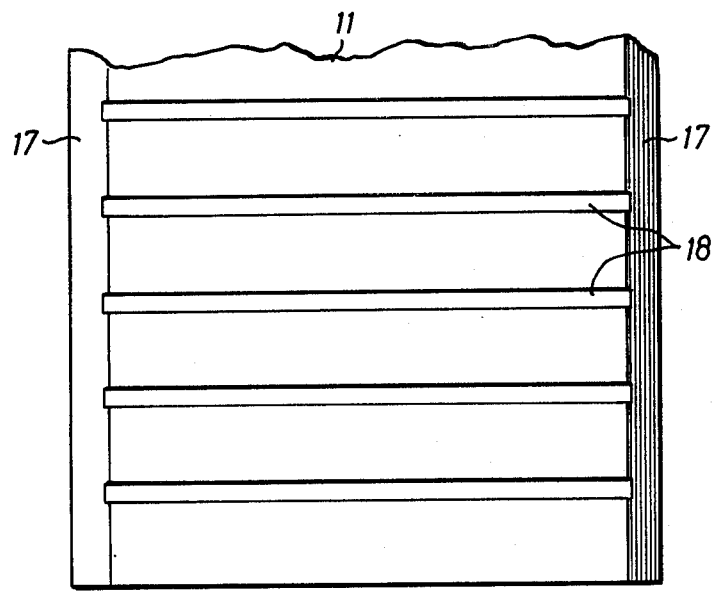
Fig_2.

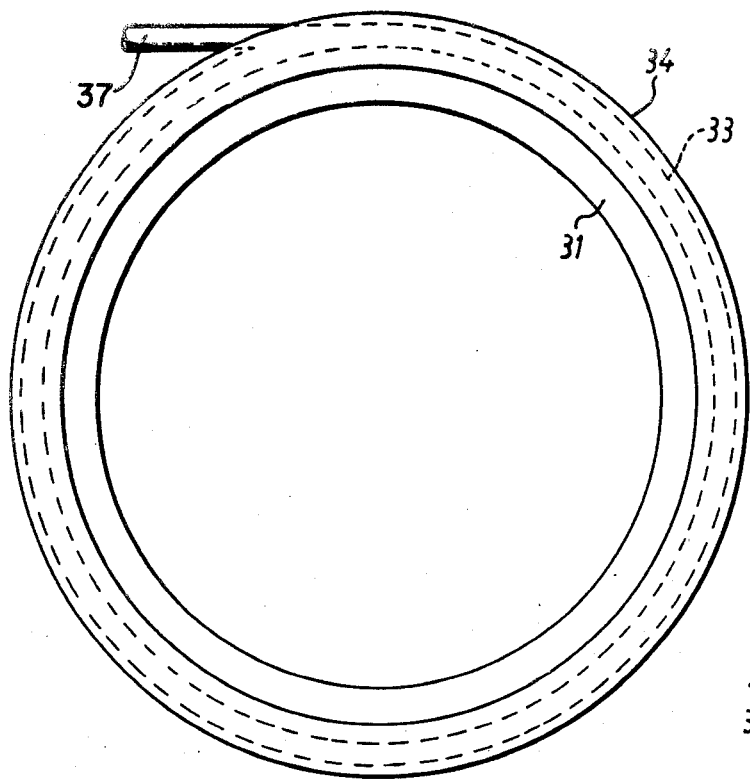
Fig_4.
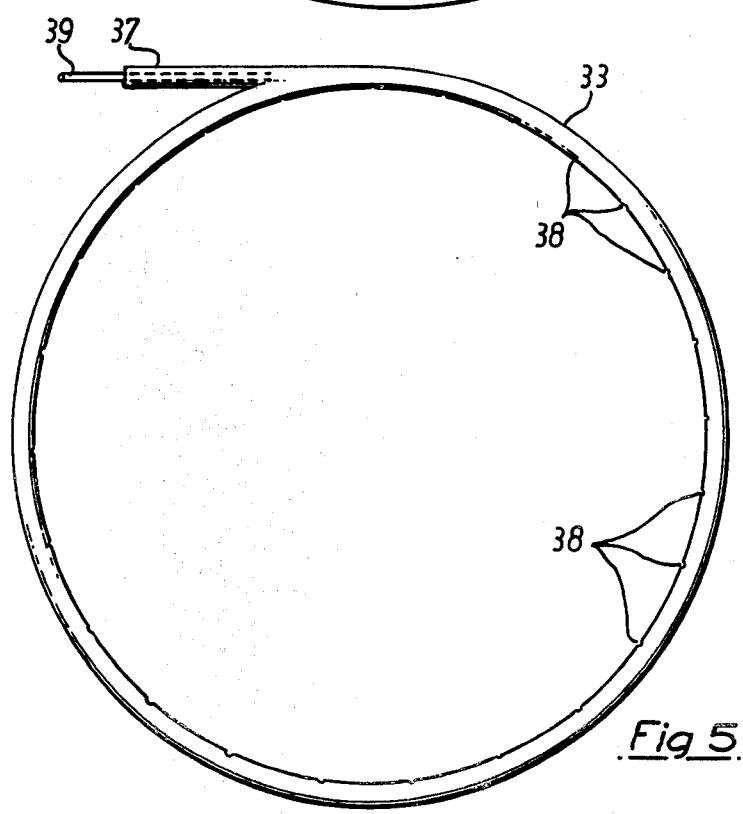
Fig_5.
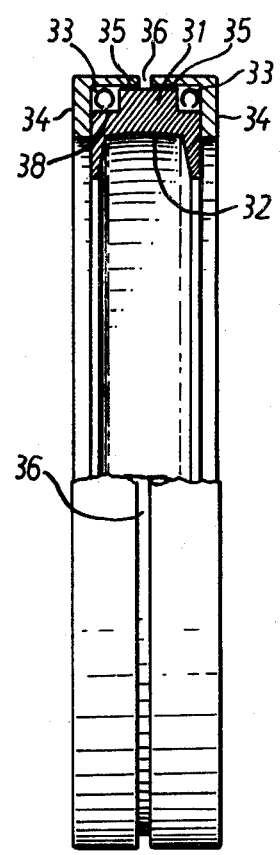
Fig_3

APPARATUS AND METHOD FOR THE HEAT TREATMENT OF MATERIALS

DESCRIPTION

This invention relates to treatment processes on materials wherein heat must be applied to the material, for instance in the curing of rubber-like materials and thermoforming of plastics materials, and is particularly concerned with the heating of moulds for this purpose. The invention includes a method of heat treating a product and apparatus for carrying out the method.

The energy consumed in the UK for drying and curing purposes has been estimated at $2 \times 10''$MJ (1,900 million therms) per annun. This total can be allocated to various different market sectors of which the rubber industry is one of considerable size. A large expenditure of process energy in the case of the manufacture of natural or synthetic rubber and certain other products of the plastics class occurs in the step of curing or vulcanising. Steam is commonly used as a heat transfer medium for this process, often resulting in an inefficient utilisation of primary energy. In the worst cases, less than one tenth of the energy input to the boiler is actually transferred to the product. As a consequence of the high energy usage for curing in the rubber industries and the generally low efficiency of conversion, there is an opportunity for conservation of energy.

The manufacture of natural or synthetic rubber goods is achieved by a variety of known process routes according to the nature of the end product, which may be new tyres, hose and belting, footwear or general rubber goods. New tyres or hose, for example, require of necessity, special bracings or reinforcements disposed within a high integrity rubber compound. By way of contrast, the sole or heel of a shoe can be permitted to have inferior mechanical properties because service failure does not have such severe consequences. Despite these individual complications, the manufacturing process invariably includes a curing or vulcanising stage consisting of the application of heat.

Traditionally this heat is supplied by a centralised steam boiler remote from the process use. Wet steam is usually employed at gauge pressures between 0 and about 1.38 MPa (200 p.s.i.) corresponding to saturation temperatures of 100° C. and 198° C. respectively. The mould must be of suitably high mechanical integrity to withstand these pressures. Due to the high latent heat content of the steam, relatively little attention has traditionally been given to the thermal design of moulds.

An even temperature distribution at the mould/rubber interface is essential for homogeneous vulcanisation and therefore for product quality. Cold spots in the mould are traditionally avoided by the ability of the condensing steam to yield its latent heat to these areas rather than by the use of detailed mould heat transfer considerations. In this way a relatively even temperature distribution is achieved at the mould/rubber interface.

For some purposes, particularly on more modern operations, such as tyre retreading, electrical heating may be used. With this type of heat source, a constant heat flux is generated by the heating element rather than a constant temperature. As a result, thermal contact resistances, in addition to the paths of thermal resistance, become important if constant temperature mould/rubber interfaces are to be achieved.

The residence time in a mould for a given product is dependent on the rate of heat penetration into the rubber and hence its thermal diffusivity and its thickness. The low thermal diffusivity of natural or synthetic rubber, typically 0.1 mm$^2$/sec., results in mould residence times in the majority of production processes of the order of 10–100 minutes depending on the rubber dimensions and degree of vulcanisation desired, but times as low at 60 seconds for a cycle tube or as high as 24 hours for an earthmover tyre may be encountered.

The use of hot gases, such as heated air, for the heating of moulds or press platens for the curing of products, has been proposed previously, but it has not been expected to compete with steam curing techniques. The heat content of steam is mainly its latent heat which it releases in its change of phase to water but its temperature remains constant, i.e. a lot of heat is available from a constant temperature source. In the case of hot gas on the other hand, a much smaller amount of heat is available for the same volume and is due to the sensible heat content of those gases. Thus, any heat transferred from the hot gas results in a fall in its temperature. It is far more difficult, therefore, to achieve mould temperature uniformity using hot gases. However, if direct gas heating could be achieved the improved thermodynamic efficiencies would result in considerable benefits, such as for example a large reduction in the fuel cost per unit of useful heat. Reference is made in this connection to U.K. Patent Specification No. 1 547 793 at page 2 lines 6 to 8 and to an article by E. Begemann entitled "Installations and processes for tyre vulcanisation" appearing in International Polymer Science and Technology Vol. 5 No. 7 1978.

According to one aspect of the present invention, an apparatus for the heat treatment of a product comprises a metallic heat transfer member for contacting the product to transmit heat thereto, a gas distribution passageway adapted to receive hot permanent gas from a hot gas source and to lead the hot gas to said heat transfer member, and one or more heat transfer passageways contiguous with said heat transfer member and communicating with said gas distribution passageway so as to receive hot gas therefrom and lead same to an exhaust outlet such as to obtain a uniform temperature distribution over the heat transfer member/product interface.

According to a second aspect of the invention, a method of heat treating a product comprises transferring heat from a hot permanent gas to a metallic heat transfer member by passing hot permanent gas through a gas distribution passageway such that the gas is directed over said metallic heat transfer member and passes along at least one heat transfer passageway contiguous with the heat transfer member to exit through an exhaust outlet, and bringing the product to be treated into contact with said heat transfer member to transmit heat to the product.

An object of the present invention is to provide an improved method and apparatus for heat treating a product, such as in curing or forming a heat curable or heat formable product, which embody the efficient use of heat and enable the production of a homogeneous product.

Preferably, the apparatus includes a plurality of orifices disposed between the gas distribution passageway and the or each heat transfer passageway for controlling the rate of flow of gas through the apparatus.

The achievement of the desired uniform temperature distribution can be affected, inter alia, by:

(1) the position, size and spacing of the orifices controlling the release of the hot gas;
(2) the thermal conductivity of the heat transfer member;
(3) the dimension of the heat transfer passageway(s) and
(4) the hydraulic impedance encountered by the hot gas in passing through the apparatus.

The achievement of uniformity of temperature distribution is therefore achieved through the control of a number of factors which to some extent will interact.

The product to be heat treated might, for example, be an unvulcanised or vulcanised natural or synthetic rubber, a heat-formable plastics material or any other product requiring in the course of manufacture the application of a heated solid surface, in the simplest case being merely a product requiring drying by heat.

The heat transfer member may be a mould in which a heat curable or heat formable product is placed or may define platens between which the product is placed or may be a drum used for continuous vulcanisation of conveyor belting as, for example in a Rotocure (Trade Mark) machine.

The gas distribution passage, of which there may be more than one, may be formed as a tube disposed adjacent to the heat transfer member or be located in the heat transfer member itself, or be formed between a face of the latter member (other than that which contacts the product) and an associated member in spaced relation with the heat transfer member.

The gas distribution passageway and the heat transfer passageways are dimensioned to achieve a desired distributed impedance or hydraulic resistance to the flow of gases to the exhaust outlet.

Preferably the hot permanent gas is produced by direct gas firing. This allows thermal energy to be applied directly to the heat transfer member from the combustion of a primary energy source, such as combustible gas, for example natural gas, in a suitable burner. The hot permanent gas may contain a proportion of vapour, for example vapours formed by combustion. Using other intermediate heat transfer media as has been done previously, there are losses with the associated plant, for example boiler system efficiency and pipe transmission losses with steam heating, heat exchanger efficiency with thermal fluids or generation and transmission efficiency with electrical heating. A hot gas generator for the direct heating of moulds in accordance with the present invention may be located adjacent to those moulds. This proximity substantially reduces the transmission losses associated with indirect heating methods. Moreover, higher heat supply temperatures may be employed using a permanent gas than using steam for heating and this can compensate for the lower heat capacity of the permanent gas.

Several types of mould may be used for carrying out the method of the invention. In one type, for example, the hot gas passes through the mould in a single pass from an inlet through the gas distribution passage(s) and heat transfer passage(s) to the exhaust outlet, where it is lost together with its residual heat energy.

In this case, the or each heat transfer passage typically includes a dimension of width which does not exceed one half inch (12.7 mm) although this can be exceeded in the case of a large mould such as used in the production of some jumbo-sized tyres. The half inch dimension of width is smaller than in conventional steam heating systems. An example of a passage having two dimensions of width is an annular passage.

It is believed that the use of such narrow passages plays a part in enabling the heat transfer member/product interface to be uniformly heated by a hot permanent gas from which heat is efficiently extracted by the heat transfer member despite the fact that the heat transfer from a permanent gas is normally low compared with steam.

In a second, recirculation type, the hot gas flows in a continuous circuit within the mould, or in a pipe within the mould, whereby the mass flow rate of the gas is enhanced. A proportion of the circulating hot gas leaves the circuit through an outlet or outlets and is replaced by fresh hot gas entering the circuit through an inlet. The heat transfer passage(s) is located between the circuit and the exhaust outlet. Heat is transferred to the heat transfer member both from the heat transfer passageway(s) and also from the gas distribution passageway, with the proportion from the gas distribution passageway being believed to be higher than in the case of the single pass system.

Where a gas burner is used to provide the hot gases, the use of recirculation of the gases within the mould is preferred to recycling hot gases from a mould outlet to the gas burner but the latter arrangement may be used if desired. The connection from the burner to the mould may be a single pipe but it may be convenient to have more than one gas input to the mould and a group of moulds may be supplied from the same burner. Alternatively, each mould may be supplied by more than one burner. The burner may be one in which the fuel gas is mixed with air (combustion air) and burnt and the burnt gas is then mixed with more air (dilution air), or the dilution air may be introduced together with that air necessary for combustion, to adjust its temperature prior to passing it to the mould.

In tests made with an unlagged mould of the single pass type, it was found that with an inlet gas temperature of 258° C. and a gas flow of 25 liters per minute, the outlet gas temperature was 91° C. The temperature along the mould/product interface varied from 88.3° C. to 89.9° C. amounting in practice to an even temperature distribution. The closeness of the outlet gas temperature to the mould/product interface temperatures shows that an efficient heat transfer from the hot gas to the mould had been achieved.

The recirculation mould was also found to give uniform temperature distribution round the mould while retaining the high thermal efficiency of the single pass mould. Correct sizing of the orifices in the recirculation tubes is important in this arrangement in order to achieve proper recirculation of gases without excessive back pressure.

As indicated above, the part of the mould containing the hot gas distribution passage(s) and the mould/product interface should be made of a material of high heat conductivity, generally a metal. An aluminium alloy is the preferred material, for example LM4, which contains magnesium and iron as alloying elements, but mild steel may also be used. Although steel, because of its lower heat conductivity, generally gives a less even temperature distribution at the mould/product interface than aluminium alloy, it is harder wearing than the alloy.

The invention will now be further described with reference to the accompanying drawings in which:

FIG. 1 is a transverse section of a mould in accordance with the present invention of the single pass design, FIG. 2 is a top plan view of the bottom plate shown in FIG. 1, FIG. 3 is a transverse section of a mould in accordance with the present invention of the recirculation design, FIG. 4 is a side view of the mould shown in FIG. 3;

FIG. 5 is a side view, corresponding to FIG. 4, of the gas recirculation pipe shown in FIGS. 4 and 5.

Figure 6:
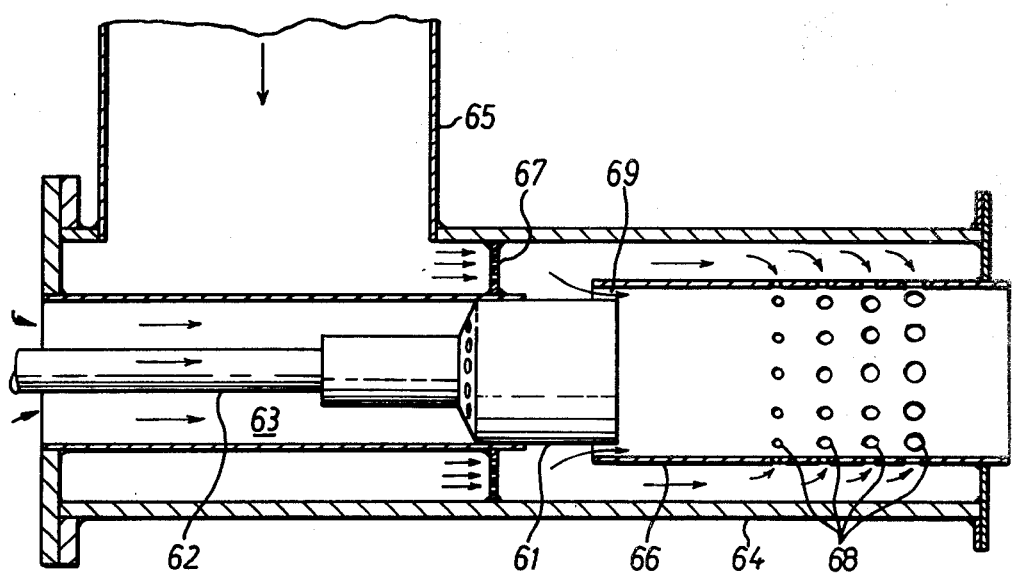
FIG. 6 is a longitudinal section of a burner suitable for supplying hot permanent gases to the mould shown in FIG. 3.

In the mould of FIGS. 1 and 2, a bottom plate 11 in the form of a substantially rectangular block of aluminium alloy is recessed into a metal top plate 12, which is covered by an asbestos wrap 13. The bottom plate 11 forms a heat transfer member for transmitting heat to a product to be heat treated, in this case a product 20 to be moulded, the member 11 being itself directly heated by hot gases as described hereinafter in such a manner as to achieve a uniform temperature distribution at the interface between the mould 11 and product 20. Ceramic gas distribution tubes 14 are housed in plate 12 and serve to supply heated permanent gas (from a source not shown) to the plate 11. Holes 15 are spaced longitudinally in tubes 14, preferably at uniform intervals, and are dimensioned and positioned so as to produce accurately metered jets of hot gas which impinge on the mould plate 11. Passages 16 are formed between chamfered faces 17 along the longitudinal side edges of plate 11 and the plate 12. Heat transfer channels 18 are cut in the plate 11 and co-operate with the adjoining surface of the plate 12 to form heat transfer passages. Exhaust ports 19, passing through the plate 12 and wrap 13, communicate with the channels 18. Thus the heated gas can flow from the tubes 14 via holes 15, passages 16 and channels 18 to exhaust ports 19. The passage of the gas through the channels 18 produces uniform heating of plate 11.

The desired temperature distribution at the mould/product interface can be affected by:

(1) the position, size and spacing of the orifices in the gas distributor tube(s) 14;

(2) the thermal conductivity of the metal component 11 forming the mould; and (3) the dimensions of the gaps or channels 18 in the mould 11 through which the hot gases pass before being exhausted.

In use, uncured natural or synthetic rubber 20 is positioned in a mould cavity in the plate 11 and the cavity is closed by a steel closure plate 21, covered by a pad of heat insulating material 22. A homogeneous rubber product results.

The hot gas would normally be combustion product such as from a gas burner, an advantageous design of burner being described further below in connection with the embodiment of FIGS. 3 to 5.

In the mould of FIGS. 3 to 5, a circular mould member 31 of aluminium alloy has a mould cavity 32 for receiving motor tyres, especially motor tyres which require retreading. The circular mould member 31 corresponds to the member 11 of FIGS. 1 and 2 and forms a heat transfer member for transmitting heat to a product to be heat treated, the member 31 being itself directly heated by hot gases as described hereinafter in such a manner as to achieve a uniform temperature distribution at the mould/product interface. The outer rim of the mould member 31 is shaped to house a pair of gas distribution tubes 33 in which the gas recirculates. The housing of the tubes is completed by a pair of flanged rings 34, secured to the member 31 so as to leave a pair of heat transfer passages 35 between the member 31 and the flanges of the rings 34 and also to leave a uniform exhaust outlet 36 between the flanges. Each circular tube 33 is provided with an inlet branch 37 and circumferentially disposed outlet holes 38 on its inner periphery. The branch 37 is fitted with an inlet tube 39 which may or may not include a nozzle, but is otherwise closed at its free end.

In use, the tyre to be moulded, or the tyre to be retreated together with unvulcanised natural or synthetic rubber retreading material, is placed in the mould cavity 32 and held in position therein by means of an inflated tube (not shown). To cure the natural or synthetic rubber in the mould cavity, hot gases from a gas burner are passed into each tube 33 through the tube 39 and are caused to circulate round the tube, some of the gases escaping through the metering holes 38. The gases escaping are balanced by the incoming gas. The momentum of the incoming gases is added to that of the gases circulating in the tube and gives them the necessary propulsion. The gases leaving the tubes through the holes 38 flow through the respective tube housings and annular passages 35 to the exhaust outlet 36. In this way the mould member 31 can be evenly heated to achieve homogeneous curing of the tyre in the mould cavity 32. As in the case of the embodiment of FIGS. 1 and 2, the desired temperature distribution at the mould/product interface can be affected by:

(1) the position, size and spacing of the orifices in the gas distribution tubes 33;

(2) the thermal conductivity of the metal component 31 forming the mould; and (3) the dimensions of the annular heat transfer passages 35 through which the hot gases pass before being exhausted.

In addition, the temperature distribution is affected by the recirculation of the gases in the gas distribution tubes 33.

Instead of recirculating the gas through the burner a second time or through a pump as might have been expected in a recirculating system in the system of FIGS. 3 to 5 the momentum of the incoming gas achieves recirculation and mixing actually within the mould itself. Residual heat is extracted from the hot gas as it passes from the metering holes 38 to the exhaust outlet 36. In addition to the factors listed above, the dimensions of the vent are also important. If the gap 36 is too small, the back pressure will be too high; if the gap is too big, the heat extracted from the gas will be reduced.

Generally, the mould member 31 should be of a high conductivity metal, for example aluminium alloy or possibly steel as indicated above. The thermal conductivity of the rings 34 is not critical. The tubes 33 may be of stainless steel. A single burner can be employed to supply hot gases to both distribution tubes 33 or two or more burners can be used. In one embodiment, for example, each tube 33 can have its own associted burner.

One example of a burner suitable for supplying hot gases to the tubes 33 of FIGS. 3 to 5 is shown in FIG. 6, in which the arrows indicate the direction of gas and air flows. A burner nozzle 61 is fed through a supply pipe 62 with combustible gas, for example natural gas.

The nozzle is mounted at one end of a combustion air chamber 63, the other end of which is open to the atmosphere. The chamber 63 is mounted in a burner casing 64, provided with an inlet 65 for dilution air. A chamber 66, for hot gases leaving the burner, is mounted within the casing 64 to receive the output from the burner nozzle. A perforated distribution plate 67 separates the part of the casing surrounding the combustion air chamber from the part of the casing surrounding the chamber 66. The chamber 66 is provided with rings of ports 68 which, as shown, increase progressively in size in the direction of the discharge end of the chamber but this change in size is optional.

When the burner is in use, gas from the pipe 62 meets combustion air, entrained in the chamber 63 by the flow of gas from pipe 62, in the burner nozzle and is ignited. The resulting gaseous combustion products pass out of the burner through the chamber 66, in which further combustion occurs. Dilution air from the inlet 65 is fed by a fan (not shown) through the perforated plate 67 and then through the ports 68 to dilute the hot combustion gases in the chamber 66. There is a clearance 69 between the inner end of the chamber 66 and the nozzle 61 to allow a small flow of dilution air between the chamber and the nozzle to cool the nozzle. The diluted hot combustion gases are fed by pipe means not shown to the tube 39 of FIG. 5.

The burner is not limited to the structure described above with reference to FIG. 6, but should be able to operate over a range of air/gas ratios, operate with good quality combustion and flame stability and be able to fire into an enclosed space, i.e. the gas distribution passageway(s) 33, at the required heat input temperature. In addition, the burner should preferably be able to operate quietly.

It will be appreciated that many modifications may be made to the invention as described with reference to the drawings. For instance, instead of using a mould of the recirculation design, for example as in FIGS. 3 to 5, the gas from the exhaust ports or other outlet means of a mould of the single pass design may be collected and most of it recirculated through a burner supplying the single pass mould. Again, a heat-exchanger may be substituted for the burner and a permanent gas circulated continuously through the heat exchanger and mould.

In both the aforegoing described embodiments, the gas distribution tubes (14,33) contain orifices through which the hot gases are directed to the respective heat transfer member 11,31. However, in other embodiments these orifices can be transferred to a position downstream of the heat transfer passages (18,35) for example in a perforated plate disposed downstream of the exhaust vent 19 or 36. In this event, the tubes 14 or 33 can be omitted altogether and the gas disbribution passageway(s) can be formed, in the first embodiment, by passages in the member 12 similar to those which currently receive the tubes 14 and, in the second embodiment, by the passages formed between the flanged rings 34 and the heat transfer member 31. In yet another embodiment, the tubes 33 of the second embodiment can be omitted and orifices corresponding to the holes 38 can be positioned between the rings 34 and the member 31 immediately upstream of the annular heat transfer passages 35.

While the drawings are concerned with moulds and moulding, it will be appreciated that the invention may also be applied to other product forming apparatus, for example extruders, injection moulding machines, semi-automatic moulds for tyres, such as Bagomatic (Trade Mark) press, Rotocure (Trade Mark) presses and platen presses. The invention may also be applied to industries other than the rubber and plastics industries where similar apparatus is used. For instance, there is a similarity in principle between a drying roll as used in the paper industry and a Rotocure (Trade Mark) machine as used in the rubber industry.

We claim:

1. A method of heat treating a product comprising transferring heat from hot permanent gas to a metallic heat transfer member by passing hot permanent gas through a gas distribution passageway which extends along the metallic heat transfer member such that the gas is directed over said metallic heat transfer member via at least one orifice, then passing the gas along at least one heat transfer passageway contiguous with the heat transfer member to exit through an exhaust outlet disposed at the downstream end of said heat transfer passageway and bringing the product to be treated into contact with said heat transfer member to transmit heat to the product.

2. Apparatus for the heat treatment of a product comprising:
   (a) a plate-like metallic heat transfer member for contacting the product to transmit heat thereto;
   (b) a pair of gas distribution tubes disposed adjacent two opposite sides of said heat transfer member and adapted to receive hot permanent gas from a hot gas source;
   (c) a plurality of orifices in said gas distribution tubes for supplying a plurality of jets of hot gas which impinge on the heat transfer member;
   (d) means defining an exhaust outlet for hot gases; and
   (e) a plurality of heat transfer passageways contiguous with said heat transfer member which receive hot gas from the orifices and lead same to said exhaust outlet.

3. Apparatus for the heat treatment of a product comprising:
   (a) an annular metallic heat transfer member whose inner peripheral surface is adapted to contact the product to be heat treated;
   (b) a pair of circular recesses on two opposite sides of said annular heat transfer member;
   (c) a pair of toroidal gas distribution tubes in said recesses, said tubes being adapted to receive hot permanent gas from a hot gas source;
   (d) a plurality of orifices in said gas distribution tubes for directing a plurality of hot gas jets onto the heat transfer member;
   (e) a pair of flanged rings disposed to cover the gas distribution tubes;
   (f) an exhaust outlet defined between said flanged rings; and
   (g) annular heat transfer passageways formed between the periphery of the heat transfer member and said flanged rings and arranged to lead hot gas discharged from said orifices to said exhaust outlet, the arrangement being such that the momentum of gas entering the tubes is added to that of gas circulating in the tubes, the gas leaving the tubes via the orifices being balanced by incoming gas supplied to said tubes.

4. Apparatus for the heat treatment of a product, comprising:

(a) a metallic heat transfer member for transmitting heat to the product;
(b) means defining a gas distribution passageway disposed along the metallic heat transfer member and adapted to receive hot permanent gas from a hot gas source and to lead the hot gas to said heat transfer member;
(c) means defining at least one orifice for the gas in its passage from the gas distribution passageway to said heat transfer member;
(d) at least one heat transfer passageway contiguous with said heat transfer member and communicating with said gas distribution passageway via said orifice, so as to receive hot gas therefrom; and
(e) an exhaust gas outlet disposed at the downstream end of said heat transfer passageway, said hot gas in said heat transfer passageway being led to said exhaust outlet such as to obtain a uniform temperature distribution over the heat transfer member/product interface.

5. Apparatus according to claim 4 including a plurality of said orifices disposed between the gas distribution passageway and the at least one said heat transfer passageway for controlling the rate of flow of gas through the apparatus,
the orifices being positioned so as to direct a plurality of jets of hot gas onto the heat transfer member.

6. Apparatus according to claim 4 including means defining a plurality of orifices downstream of the at least one said heat transfer passageway for controlling the rate of flow of gas through the apparatus.

7. Apparatus according to claim 4, constructed such that the gas makes a single pass through the apparatus before being exhausted via said exhaust outlet, said at least one said heat transfer passageway being formed by a channel in the surface of said metallic heat transfer member.

8. Apparatus according to claim 7 wherein said gas distribution passageway is formed by a tube having a plurality of holes therein forming said orifices.

9. Apparatus according to claim 7, wherein said metallic heat transfer member comprises a generally rectangular metal block whose one longitudinal surface is arranged, in use, to contact the product being heat treated and whose opposite longitudinal surface contains a plurality of transverse channels serving as heat transfer passageways, there being two said gas distribution passageways disposed respectively along the two longitudinal edges of said opposite surface of the block.

10. Apparatus according to claim 9, wherein said two longitudinal edges of the block are chamfered to provide respective spaces between the block and said two gas distribution passageways.

11. Apparatus according to claim 9 wherein a metal housing place covers the gas distribution passageway and said opposite surface of the block, said exhaust outlet being formed by at least one aperture extending through the plate and communicating with said heat transfer passageways along the longitudinal centre line of the block.

12. Apparatus for the heat treatment of a product, comprising:
(a) a metallic heat transfer member for transmitting heat to the product;
(b) means defining a gas distribution passageway disposed around the metallic heat transfer member and adapted to receive hot permanent gas from a hot gas source and to lead the hot gas to said heat transfer member;
(c) means defining at least one orifice for the gas in its passage from the gas distribution passageway to said heat transfer member;
(d) at least one heat transfer passageway contiguous with said heat transfer member and communicating with said gas distribution passageway via said orifice, is as to receive hot gas therefrom, and
(c) an exhaust gas outlet disposed at the downstream end of said heat transfer passageway, said hot gas in said heat transfer passageway being led to said exhaust outlet such as to obtain a uniform temperature distribution over the heat transfer member/product interface.

13. Apparatus according to claim 12 wherein the gas distribution passageway is constructed such that the hot gas is recirculated around it a number of times before passing to the at least one said heat transfer passageway, said metallic heat transfer member being of annular configuration, its inner peripheral surface being arranged, in use, to contact the product being heat treated and its outer periphery being recessed at its two sides to receive respective apertured toroidal tubes serving as gas distribution passageways, respective annular heat transfer passageway being formed between the periphery of the annular heat transfer member and a pair of flanged rings disposed to cover the gas distribution tubes.

14. Apparatus according to claim 13 wherein the exhaust outlet is formed between adjacent surfaces of said flanged rings around the outer periphery of the heat transfer member.

15. Apparatus according to claim 13 wherein each said toroidal tube includes a generally tangentially directed inlet piece by which gas is introduced to that tube, the arrangement being such that the momentum of incoming gas is added to that of gas circulating in the tube, the gas leaving the tubes via the apertures being balanced by incoming gas supplied to said inlet piece.

16. Apparatus according to claim 15 in which said inlet piece includes a nozzle for controlling the speed of the circulating gas.

17. A moulding system for use in the curing of rubber-like materials and thermoforming of plastics materials, comprising:
(a) a metallic heat transfer member defining a mould for receiving the product to be worked;
(b) a gas distribution passageway contiguous with said heat transfer member for directing hot permanent gas towards said heat transfer member;
(c) means defining at least one orifice for the gas in its passage from the gas distribution passageway to said heat transfer member;
(d) means for producing a hot permanent gas and supplying same directly to said gas distribution passageway without recourse to other immediate elements of fluids to transfer the heat;
(e) at least one heat transfer passageway contiguous with said heat transfer member and communicating with said gas distribution passageway via said orifice, so as to receive hot gas therefrom, and
(f) an exhaust gas outlet disposed at the downstream end of said heat transfer passageway, said hot gas in said heat transfer passageway being led to said exhaust outlet such as to obtain a uniform temperature distribution over the transfer member/product interface.

* * * * *

UNITED STATES PATENT AND TRADEMARK OFFICE
CERTIFICATE OF CORRECTION

PATENT NO.  : 4,460,533
DATED       : July 17, 1984
INVENTOR(S) : Robert W. Cox, et al.

It is certified that error appears in the above-identified patent and that said Letters Patent is hereby corrected as shown below:

On the front page of U.S. Patent 4,460,533, line 30 "FOREIGN APPLICATION PRIORITY DATA", change "Apr. 9, 1981" to --May 9, 1981--.

Signed and Sealed this

Twenty-first Day of May 1985

[SEAL]

Attest:

DONALD J. QUIGG

Attesting Officer     Acting Commissioner of Patents and Trademarks